June 26, 1934. L. E. LA BRIE 1,964,162
BRAKE
Filed Oct. 6, 1928 2 Sheets-Sheet 1

INVENTOR.
Ludger E. La Brie
BY
ATTORNEY

INVENTOR.
Ludger E. LaBrie
BY
ATTORNEY.

Patented June 26, 1934

1,964,162

UNITED STATES PATENT OFFICE 1,964,162

BRAKE

Ludger E. La Brie, South Bend, Ind., assignor to Bendix Brake Company, South Bend, Ind., a corporation of Illinois Application October 6, 1928, Serial No. 310,836

24 Claims. (Cl. 188—78)

This invention relates to brakes, and is illustrated as embodied in an internal expanding brake for an automobile. An object of the invention is to provide certain modifications of the brake of my prior application No. 304,196, filed September 6, 1928, which may be used in connection with that brake if desired to achieve the advantages pointed out below. Various features of novelty relate to an improved shiftable anchorage, to the shoe-positioning means, and to other novel and desirable details of construction which will be apparent from the following description of the illustrative embodiments shown in the accompanying drawings, in which:

Figure 1:
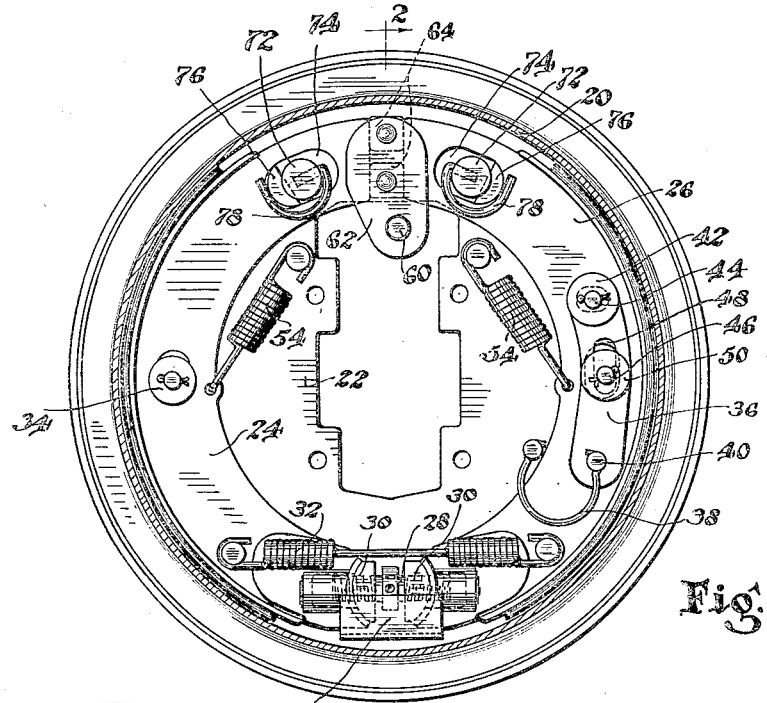
Figure 1 is a vertical section through one form of the brake, just inside the head of the brake drum, and showing the brake shoes in side elevation.
Figure 2:
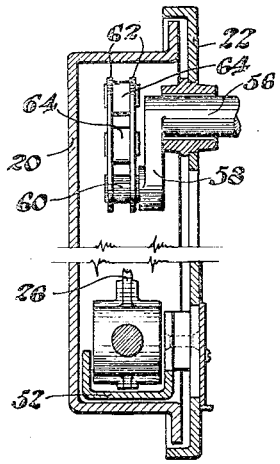
Figure 2 is a vertical section through the brake at right angles to Figure 1, and on the line 2—2 of Figure 1, but with the central portion of the brake omitted.

In the arrangement of Figures 1 and 2 the brake includes a rotatable drum 20, at the open side of which is a support such as a backing plate 22, and within which is arranged the friction means of the brake. The friction means preferably includes a pair of articulated arcuate floating shoes 24 and 26, preferably interchangeable, arranged to anchor on shoe 24 when the drum is turning clockwise and on the shoe 26 when the drum is turning counterclockwise.

The articulation of shoes 24 and 26, which includes the brake adjustment, is shown in the form of a right-and-left threaded adjusting member 28 threaded into approximately semi-cylindrical thrust members 30 seated in correspondingly-shaped sockets in the ends of the shoes, the shoes being held against the adjustable and expansible joint so formed by means such as a spring 32 tensioned between them.

Shoes 24 and 26 are provided with suitable steady-rests 34 and with adjustable stop means 36 co-operating with a spring 38 to determine the released or idle position of shoe 26 (and therefore also of shoe 24). The stop member 36 is in the form of a plate pivoted to the shoe at 40 at one end, and having its other end frictionally clamped to the shoe by means such as a spring held compressed by a washer 42 on a pin 44 passing through the shoe. A stationary pin 46 carried by the backing plate passes through a relatively large opening in the backing plate and through a slot 48 in the plate 36, the slot 48 being slightly wider than the diameter of pin 46 by an amount equal to the required clearance of shoe 26 when the brake is released. Pin 46 has washers 50 on opposite sides of the shoe web and plate 36.

The lower ends of the shoes are confined laterally by a U-shaped stamping 52 secured to the backing plate and embracing the flattened ends of the thrust members 30 which form part of the brake adjustment.

Figure 3:
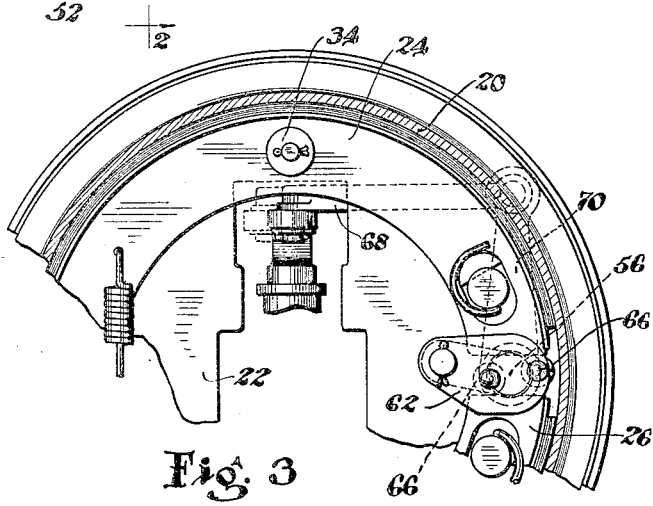
Figure 3 is a partial section corresponding to a portion of Figure 1, disclosing a modified form of brake, the same turned 90° relative to the brake of Figure 1.
Figure 4:
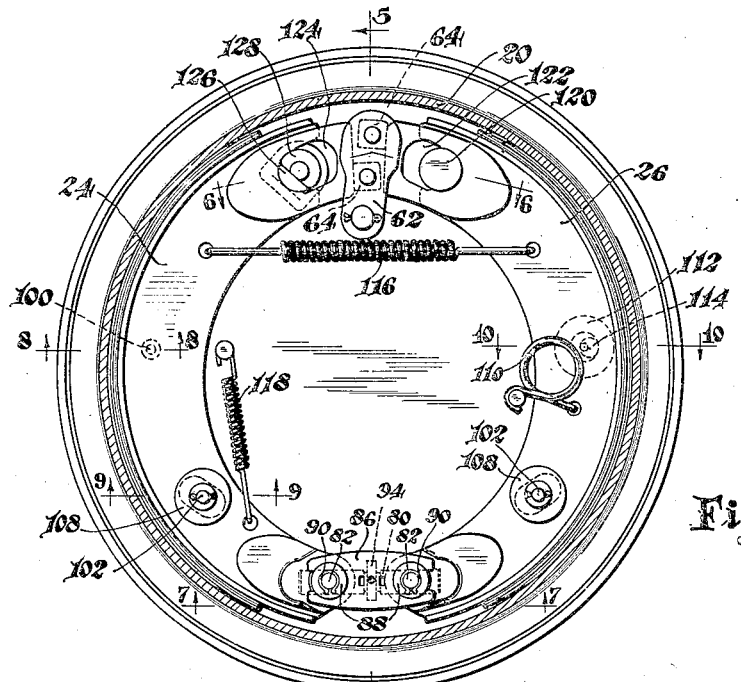
Figure 4 is a section corresponding to Figure 1, but showing a different modification.
Figures 5, 6:
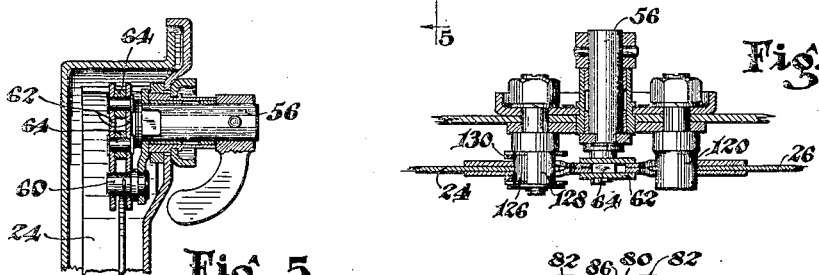
Figure 5 is a section on the line 5—5 of Figure 4, centrally through the brake of Figure 4, but with the central portion of the brake omitted.
Figure 6 is a partial section through the applying means of the brake, on the line 6—6 of Figure 4.
Figure 7:
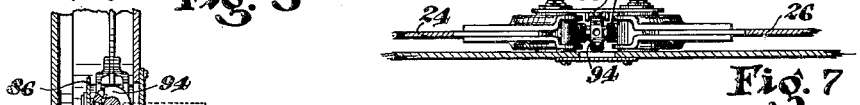
Figure 7 is a partial section through the adjustment of the brake, on the line 7—7 of Figure 4.

The brake is applied, against the resistance of vertically inclined return springs 54 tensioned between the backing plate and the respective shoes, by means such as a camshaft 56 having a crank arm 58 with a pivot 60 at its end supporting a floating operating lever including two side plates 62 between which are pivoted thrust blocks 64 engaging the adjacent shoe ends. In Figure 3 I have illustrated thrust rollers 66 in place of the square thrust blocks 64.

In this figure, the entire brake is turned 90°, to give greater clearance above the front wheel king pin, and operation is through a horizontal link 68 connected at one end in line with the king pin to a horizontal brake-applying lever fulcrumed on the axle and connected at its other end to a lever 70 on camshaft 56.

An important feature of the invention relates to the brake anchorage shown in Figure 1. This anchorage includes two fixed pins 72 extending through openings 74 in the shoe ends, and flattened on their sides to be slidably engaged by plano-convex thrust members 76. Members 76 have flat sides engaging the flat sides of the anchor pins, and cylindrical sides pivotally engaged by the rounded ends of openings 74. Springs 78 may have their ends inserted in sockets in the anchor pins 72 opposite members 76, and extend around the anchor pins in such a manner as yieldingly to embrace members 76 and hold them on the anchor pins. Springs 54, the rear one of which is preferably stronger than the other, hold the shoes yieldingly upward against the anchor pins. This arrangement permits a radial outward shifting, when the brake is applied, of the anchored end of whichever one of the shoes happens to be anchored.

In Figures 4–12, shoes 24 and 26 are adjustably connected by a right-and-left threaded member 80 threaded into cylindrical pivots 82 mounted transversely of the adjacent shoe ends and grooved at their ends to receive slots 84 in the ends of a locking plate 86, plate 86 being held by washers 88 secured on pivots 82 by means such as snap rings 90. Plate 86 may have lugs 92 embracing an operating collar 94 at the center of the adjusting member 80, and a rounded projection or tooth 96 serving as a pawl to seat yieldingly in one or another of a series of radial tool-receiving sockets in collar 94.

Figure 8:
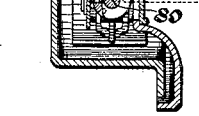
Figure 8 is a partial section on the line 8—8 of Figure 4, showing a steady rest.
Figure 9:
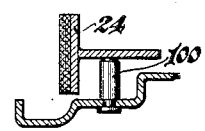
Figure 9 is a partial section on the line 9—9 of Figure 4, showing another steady rest.
Figure 10:
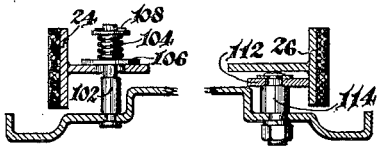
Figure 10 is a partial section on the line 10—10 of Figure 4, showing an adjustable stop for one of the shoes.
Figure 11:
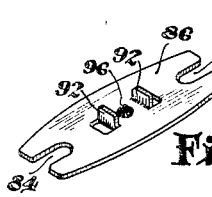
Figure 11 is a perspective view of a member used to lock the brake adjustment.
Figure 12:
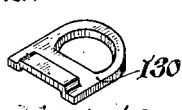
Figure 12 is a perspective view of a member used to hold the sliding anchor part on the anchor proper.

The shoes may have one or more steady-rest pins 100, carried by the backing plate and engaging the backing-plate sides of the shoes as shown in Figure 8; preferably also steady rests of the type shown in Figure 9 and including a pin 102 carried by the backing plate and passing through a relatively large opening in the shoe and having a spring 104 confined between a washer 106 engaging the drum side of the shoe and a washer 108 held by means such as a cotter pin on the end of the pin 102.

Shoe 26 may be held when released by a spring 110, tensioned between the shoe and the backing plate, against a roller 112 mounted on an adjustable eccentric 114 carried by the backing-plate.

In this brake the return spring 116 is tensioned directly between the shoes, and is aided by spring 110 acting on shoe 26 and by an auxiliary spring 118 acting generally vertically on shoe 24.

The anchorage of this brake includes a simple solid pivot 120 engaged by the rounded end of a slot 122 in shoe 26, and serving as the anchor when the car is moving forward, in which case the drum is turning counter-clockwise. When the drum is turning in the opposite direction (car moving backward), the rounded end of a slot 124 in shoe 24 pivotally anchors against a plano-convex thrust member 126, corresponding to members 76, and which slidably engages a flat face formed on an anchor pivot 128. Member 126 is held by the retainer 130 sleeved on anchor pin 128 and shown in perspective in Figure 12.

While two illustrative embodiments have been described in detail, it is not my intention to limit the scope of the invention to those particular embodiments, or otherwise than by the terms of the appended claims.

I claim:

1. A brake comprising, in combination, a drum, floating friction means within the drum, and a pair of anchors on one of which said means anchors when the drum is turning in one direction and on the other of which the friction means anchors when the drum is turning in the other direction, at least one of said anchors including a fixed post and a thrust part acted on by the friction means and radially slidable in thrust engagement with said fixed post.

2. A brake comprising, in combination, a drum, floating friction means within the drum including a pair of articulated shoes, and a pair of anchors arranged respectively between the ends of said shoes and on one of which the adjacent shoe between the ends of which it is arranged anchors when the drum is turning in one direction and on the other of which the other shoe anchors when the drum is turning in the other direction, both of said anchors including parts capable of relative shifting generally radially of the drum.

3. A brake comprising, in combination, a drum, floating friction means within the drum, and a pair of anchors passing through openings in the opposite end web portions of the friction means and on one of which said means anchors when the drum is turning in one direction and on the other of which the friction means anchors when the drum is turning in the other direction, said anchors including parts capable of relative shifting generally radially of the drum.

4. A brake comprising, in combination, a drum, floating friction means within the drum, and a pair of anchors on one of which said means anchors when the drum is turning in one direction and on the other of which the friction means anchors when the drum is turning in the other direction, at least one of said anchors including a fixed post having a flat radial surface and a thrust part slidable against said surface generally radially of the drum.

5. A brake comprising, in combination, a drum, floating friction means within the drum, and a pair of anchors on one of which said means anchors when the drum is turning in one direction and on the other of which the friction means anchors when the drum is turning in the other direction, both of said anchors including fixed parts having flat radial thrust surfaces and thrust parts having corresponding surfaces in movable engagement therewith.

6. A brake comprising a shoe formed with an elongated slot, in combination with an anchor projecting through said slot and formed with a flat side, and a plano-convex member having a flat side slidably engaging the flat side of the anchor and a cylindrical side pivotally engaged by one end of said slot.

7. A shiftable-anchorage brake comprising a floating shoe, in combination with an anchor projecting through said shoe and formed with a flat side, and a plano-convex member having a flat side slidably engaging the flat side of the anchor and a cylindrical side pivotally engaged by said shoe.

8. A brake anchor comprising a fixed pin having at least one flat side, in combination with a bearing member having a flat side engaging the flat side of said pin and having its other side cylindrical, together with means carried by the pin and holding said member against the pin.

9. A brake anchor comprising a fixed pin having at least one flat side, in combination with a bearing member having a flat side engaging the flat side of said pin and having its other side cylindrical, together with a spring carried by the pin and holding said member against the pin.

10. An anchor pivot having a flat side and formed with a socket for the end of a spring on the side opposite said flat side.

11. A brake comprising, in combination, a pair of articulated shoes, a stop engaging one of the shoes, and a torsion spring engaging the other shoe and acting through the articulation between the shoes to urge said one shoe toward its stop.

12. A brake comprising a fixed support, a friction element on the support, a stop for the friction element and a spring composed of a single loop having one end engaging the fixed support and its other end engaging the friction element.

13. A brake comprising a fixed support, a pair of articulated friction elements on the support, a stop for one of the friction elements and a spring composed of a single loop connected between the fixed support and the other friction element.

14. A brake anchorage comprising a pair of anchor pivots having oppositely-facing flat sides paralleling the pivot axes and recessed therein.

15. An anchor pivot having a flat side paralleling the pivot axis and recessed therein a short distance from its end, and a movable thrust part in engagement therewith.

16. A brake anchor comprising a pivot having a flat side, and a plano-convex thrust member slidably engaging said side.

17. A brake anchor comprising a pivot having a flat side, a plano-convex thrust member slidably engaging said side, and means tending to restrain said member from shifting upon said pivot.

18. A brake anchor comprising a pivot having a flat side, a plano-convex thrust member slidably engaging said side, and means yieldingly maintaining said member in sliding engagement with said pivot.

19. A brake comprising a drum, a pair of spaced round anchors having oppositely-facing substantially flat surfaces, and friction means engageable with said surfaces and anchoring against one of said surfaces when the drum is turning in one direction and against the other of said surfaces when the drum is turning in the other direction.

20. A brake comprising a pair of spaced round anchors having oppositely-facing substantially flat surfaces, and friction means engageable with said surfaces and anchoring thereagainst.

21. A brake comprising a drum, a pair of round anchors having oppositely-facing generally radial surfaces, and articulated shoes one of which anchors against one of said surfaces when the drum is turning in one direction and the other of which anchors against the other of said surfaces when the drum is turning in the other direction.

22. A brake comprising a pair of round anchors having oppositely-facing generally radial surfaces, and articulated shoes in movable anchoring engagement with said surfaces respectively.

23. A brake comprising a drum, a pair of anchors having oppositely-facing generally radial surfaces, and articulated shoes having webs formed with elongated openings through which said anchors extend respectively and one of which anchors against one of said surfaces when the drum is turning in one direction and the other of which anchors against the other of said surfaces when the drum is turning in the other direction.

24. A brake comprising a pair of anchors having oppositely-facing generally radial surfaces, and articulated shoes having webs formed with elongated openings through which said anchors extend respectively and in movable anchoring engagement with said surfaces respectively.

LUDGER E. LA BRIE.